R. FROMMER.
CONNECTION OF HELICAL SPRINGS.
APPLICATION FILED NOV. 5, 1907.

949,466.

Patented Feb. 15, 1910.

2 SHEETS—SHEET 1.

Witnesses:
L. H. Staaden
Ja Wright

Inventor:
Rudolf Frommer,
by Alfred Müller,
Atty.

R. FROMMER.
CONNECTION OF HELICAL SPRINGS.
APPLICATION FILED NOV. 5, 1907.

949,466.

Patented Feb. 15, 1910.

2 SHEETS—SHEET 2.

Witnesses:
J. C. White
L. H. Staaden.

Inventor:
Rudolf Frommer

UNITED STATES PATENT OFFICE.

RUDOLF FROMMER, OF BUDAPEST, AUSTRIA-HUNGARY.

CONNECTION OF HELICAL SPRINGS.

949,466.  Specification of Letters Patent. Patented Feb. 15, 1910.

Application filed November 5, 1907. Serial No. 400,817.

*To all whom it may concern:*

Be it known that I, RUDOLF FROMMER, manager, subject of the King of Hungary, residing at Budapest, Austria-Hungary, have invented certain new and useful Improvements in and Relating to Connections of Helical Springs, of which the following is a specification.

The present invention has for its object a device to connect a helical spring arranged between two members of a mechanism with one of said members.

The new device comprises a connecting element adapted to transmit the action of said helical spring, which latter is embedded in one of the said members. The latter is provided with grooves to permit the insertion of the connecting element and further with guiding grooves adapted to be engaged by corresponding projections of the connecting element and provided with shoulders forming abutments, whereby the extreme position of the connecting element is defined. The said guiding grooves are placed at right angles to the grooves permitting the insertion of the connecting element, so that the latter in order to engage with its projection the guiding grooves must be turned about an angle of 90°.

Figure 1:
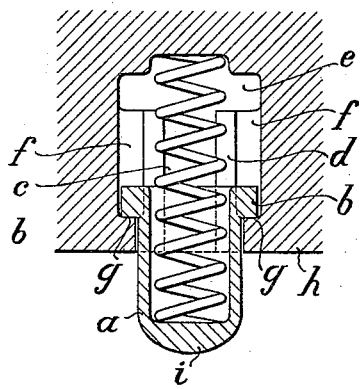
Figure 3:
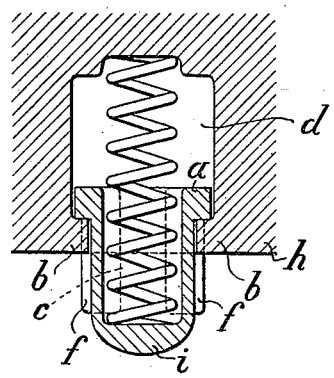
Figure 2:
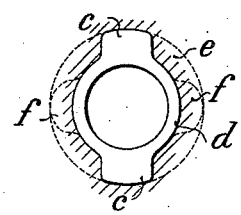
Figure 4:
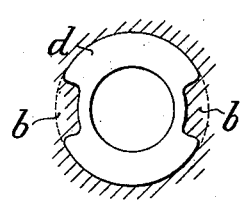
Figure 5:
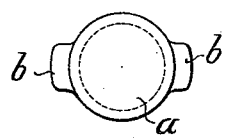
Figure 6:
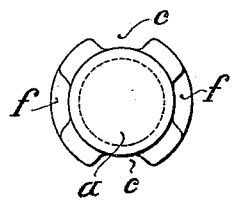
Figure 7:
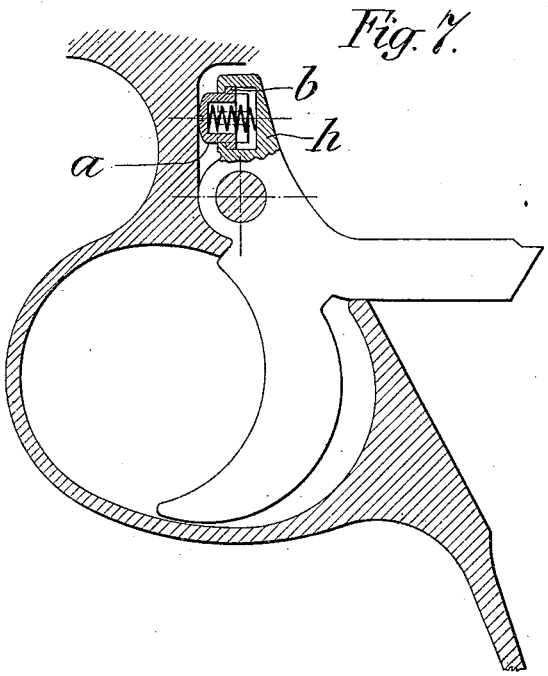
Figure 8:
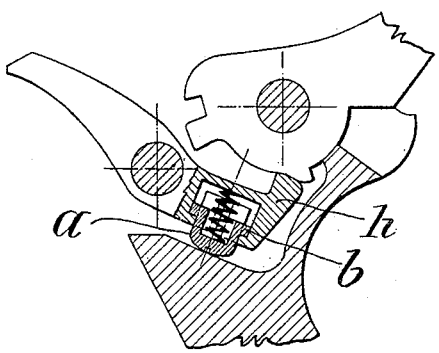

On the accompanying drawing, two forms of the new device are illustrated, Figures 1 and 2 being longitudinal sections therethrough, Figs. 3 and 4 being cross-sections through the bearing for the helical spring and Figs. 5 and 6 being lower plan views of the connecting element. Fig. 7 shows the new device in use with the trigger of a hand-loading fire arm; and Fig. 8 shows the new device applied to a trigger-pin.

In the form shown in Figs. 1, 3 and 5, the connecting element has the shape of socket $a$, and is placed over the free end of a helical spring, which is embedded in a bore of one of two members of a mechanism. In the drawing only the member $h$ containing the spring is shown, the latter projecting outside of said member. The socket $a$ is provided at its inner end with two lateral projections $b$, adapted to enter grooves $f$, which are formed in a bearing $d$ for the spring, the bearing $d$ being fastened in the bore of the member $h$, or forming an integral part thereof. The said grooves $f$ extend at one end to an annular groove $e$, provided in the member $h$ at the inner end of the bearing $d$. At the other end, the grooves $f$ extend to a point near the opening of the bore, where shoulders $g$ are formed, which, upon the insertion of the socket $a$ act as abutments for the projections $b$, which will bear against said shoulder $g$. The bearing $d$ for the spring is also provided with two grooves $c$ in a plane at a right angle with respect to the plane of the grooves $f$. Said grooves $c$ extend from the annular groove $e$ to the opening of the bore in the member $h$. The bottom $i$ of the socket $a$ is curved toward the outside.

After the helical spring has been inserted into the bore of the member $h$, the socket $a$ is placed over the free end of the spring in such a position that its lateral projections $b$ register with the grooves $c$. The socket is then forced against the action of the spring into the bore, until the projections $b$ enter the annular groove $e$, whereupon the socket $a$ is turned about an angle of 90°, until the projections $b$ register with the grooves $f$. Now, when the socket $a$ is released, the projections $b$ under the action of the compressed spring will enter the grooves and the socket $a$ will be moved outward, until its projections $b$ come to bear against the shoulders $g$, which arrest a further outward movement of the socket $a$. In this position of the parts the spring and socket are securely connected with the member $h$, and the spring is protected against any outside influence as well as against injury or loss. The action of the spring is transmitted to the curved portion $i$ of the socket, which insures an easy and smooth action of the spring. In order to prevent an unintentional separation of the parts, the grooves $c$ are made so long, that the portion $i$ of the socket $a$ scarcely projects beyond the opening of the bore, when the projections $b$ of the socket are in the annular groove $e$, in which position the socket can be turned only with the aid of a tool, but not by hand.

In the form, shown in Figs. 2, 4 and 6, the projections $b$ are not provided on the connecting socket $a$, but on the outer rim of the bearing $d$ of the member $h$, the socket being formed in this case with two grooves $c$ and $f$. The grooves $c$ extend the whole length of the socket $a$, whereas the grooves $f$, at their inner ends, are closed by projecting parts, which bear against the projections $b$, whereby the extreme outer position of the socket $a$ in the bearing $d$ is determined. The insertion and removal of the socket $a$ and the spring into and from the member $h$ are effected in the same manner as in the form shown in Figs. 1, 3 and 5, the socket being forced into the member $h$ to the end of the bearing $d$ and then being turned about an angle of 90°.

Figs. 7 and 8 show the application of the new device to a fire-arm in connection with the trigger and the trigger pin respectively.

I claim:

1. Device for the connection of a helical spring with one of two members of a mechanism, comprising in combination with the said member and spring, a bearing for said spring provided in said member and having grooves arranged in planes disposed at right angles with respect to each other, a socket having projections adapted to enter said grooves, an annular groove in said member to permit the turning of said projections about an angle of 90°, and shoulders provided in said member forming abutments to limit the outward movement of the said socket under the action of the said spring in the grooves provided as guides for the said projection.

2. A device for connecting a helical spring with one of two members of a mechanism, comprising in combination with the said member and spring a bearing for said spring provided in said member and having grooves disposed at right angles with respect to each other, and a socket having projections adapted to enter said grooves, an annular groove provided in said member, permitting the turning of said socket about an angle of 90°, and shoulders in said member, forming abutments to limit the outward movement of said socket, the said annular groove being located at the inner end of said member to cause the entire insertion of said socket into said member to prevent its being turned by hand.

In testimony whereof I affix my signature in presence of two witnesses.

RUDOLF FROMMER.

Witnesses:
PHILIP SCHÖN,
LESLIE ILSASZ.